(12) United States Patent
Faruque et al.

(10) Patent No.: US 10,799,976 B2
(45) Date of Patent: Oct. 13, 2020

(54) METHOD OF FABRICATING ROLL-BONDED EXPANDED LOAD-BEARING ALUMINUM LAMINATE STRUCTURAL ELEMENTS FOR VEHICLE

(71) Applicant: Ford Global Technologies, LLC, Dearborn, MI (US)

(72) Inventors: Mohammed Omar Faruque, Ann Arbor, MI (US); Kevin Pline, Plymouth, MI (US); Srinivasan Sundararajan, Ann Arbor, MI (US); James Chih Cheng, Troy, MI (US); Matthew John Zaluzec, Canton, MI (US); Fubang Wu, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/959,562

(22) Filed: Dec. 4, 2015

(65) Prior Publication Data
US 2016/0082544 A1    Mar. 24, 2016

Related U.S. Application Data

(63) Continuation of application No. 13/892,861, filed on May 13, 2013, now abandoned.

(51) Int. Cl.
| | | |
|---|---|---|
| *B23K 20/00* | (2006.01) | |
| *B23K 20/02* | (2006.01) | |
| *B32B 7/05* | (2019.01) | |
| *B62D 29/00* | (2006.01) | |
| *B62D 25/10* | (2006.01) | |

(Continued)

(52) U.S. Cl.
CPC ............ *B23K 20/023* (2013.01); *B21D 47/01* (2013.01); *B21D 47/04* (2013.01); *B23K 20/26* (2013.01); *B32B 7/05* (2019.01); *B62D 25/105* (2013.01); *B62D 29/008* (2013.01); *Y10T 428/12347* (2015.01)

(58) Field of Classification Search
CPC .... B21D 26/055; B21D 22/201; B23K 20/02; B23K 20/026; B23K 20/14
USPC .............. 228/157, 193, 118, 262.5; 29/421.1
See application file for complete search history.

(56) References Cited

U.S. PATENT DOCUMENTS

| | | |
|---|---|---|
| 1,417,664 A | 5/1922 | Garlinghouse |
| 2,391,997 A | 1/1946 | Noble |

(Continued)

*Primary Examiner* — Erin B Saad
(74) *Attorney, Agent, or Firm* — David Coppiellie; Brooks Kushman P.C.

(57) ABSTRACT

An expanded laminate and method of forming an expanded laminate are disclosed. In at least one embodiment, the method includes selectively applying a relatively high temperature-resistant material to a surface of a first metal sheet to form a covered portion and an uncovered portion and diffusion bonding the first metal sheet to a second metal sheet at the uncovered portion to form a bonded region and an unbonded region. Pressurized gas may be introduced between the first and second metal sheets to expand the first and second metal sheets in the unbonded region. The metal sheets may be aluminum sheets. The sheets may be positioned in a die having a plurality of cavities such that when the pressurized gas is introduced the sheets expand into the cavities. The diffusion bonding may be performed by applying pressure, for example, using rollers.

17 Claims, 13 Drawing Sheets

(51) Int. Cl.
  *B21D 47/01* (2006.01)
  *B21D 47/04* (2006.01)
  *B23K 20/26* (2006.01)

(56) References Cited

U.S. PATENT DOCUMENTS

| | | |
|---|---|---|
| 2,481,046 A | 9/1949 | Scurlock |
| 2,699,599 A | 1/1955 | Potchen |
| 2,858,247 A | 10/1958 | De Swart |
| 3,175,893 A | 3/1965 | Meretsky |
| 3,196,763 A | 7/1965 | Rushton |
| 3,226,602 A | 12/1965 | Elfving |
| 3,246,669 A | 6/1966 | Seiwert |
| 3,507,634 A | 4/1970 | O'Driscoll |
| 4,210,127 A | 7/1980 | Kleine et al. |
| 4,411,121 A | 10/1983 | Blacklin et al. |
| 4,483,478 A * | 11/1984 | Schulz ............... B21D 26/055 228/157 |
| 4,559,274 A | 12/1985 | Kloppe et al. |
| 4,882,823 A * | 11/1989 | Weisert ............... B21D 26/055 228/157 |
| 4,948,457 A * | 8/1990 | Cooper ............... B23K 20/2333 216/103 |
| 5,069,383 A * | 12/1991 | Cooper ............... B23K 20/00 228/118 |
| 5,118,026 A * | 6/1992 | Stacher ............... B23K 20/18 228/157 |
| 5,139,887 A * | 8/1992 | Sutton ............... B21D 47/00 428/586 |
| 5,904,992 A * | 5/1999 | Yasui ............... B23K 20/023 428/593 |
| 6,063,507 A | 5/2000 | Blumel et al. |
| 6,065,266 A | 5/2000 | Behr et al. |
| 6,939,599 B2 | 9/2005 | Clark |
| 7,488,017 B2 | 2/2009 | Lassle et al. |
| 8,835,016 B2 | 9/2014 | Ebnoether |
| 2005/0084703 A1 | 4/2005 | Ashmead |

\* cited by examiner

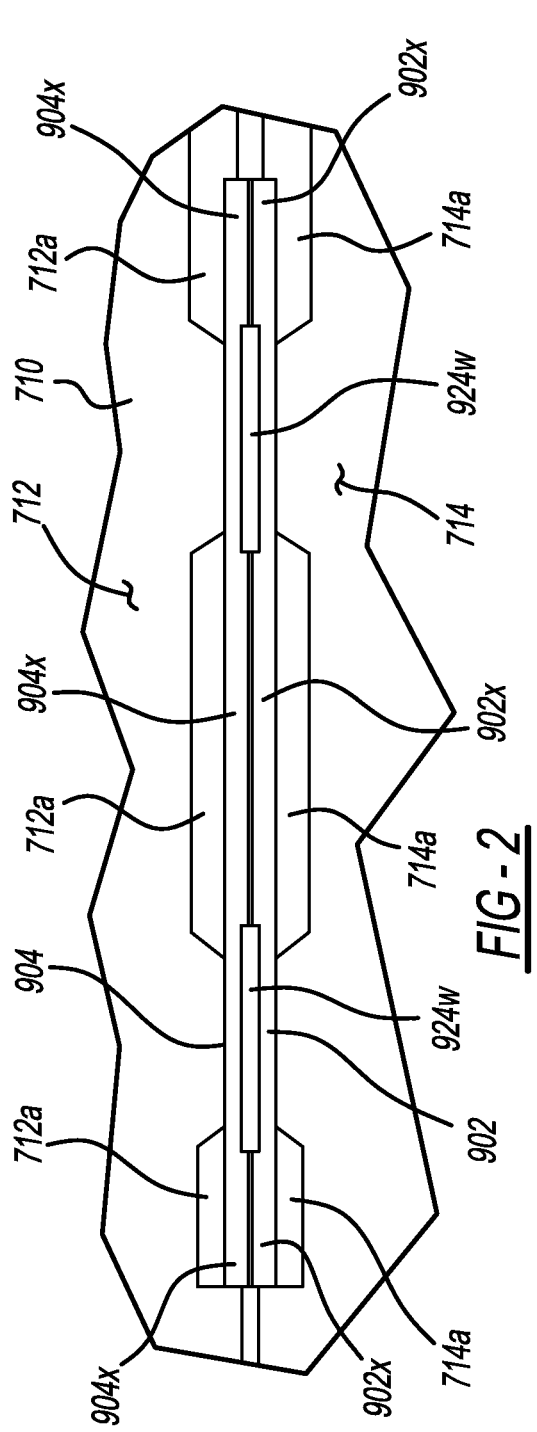
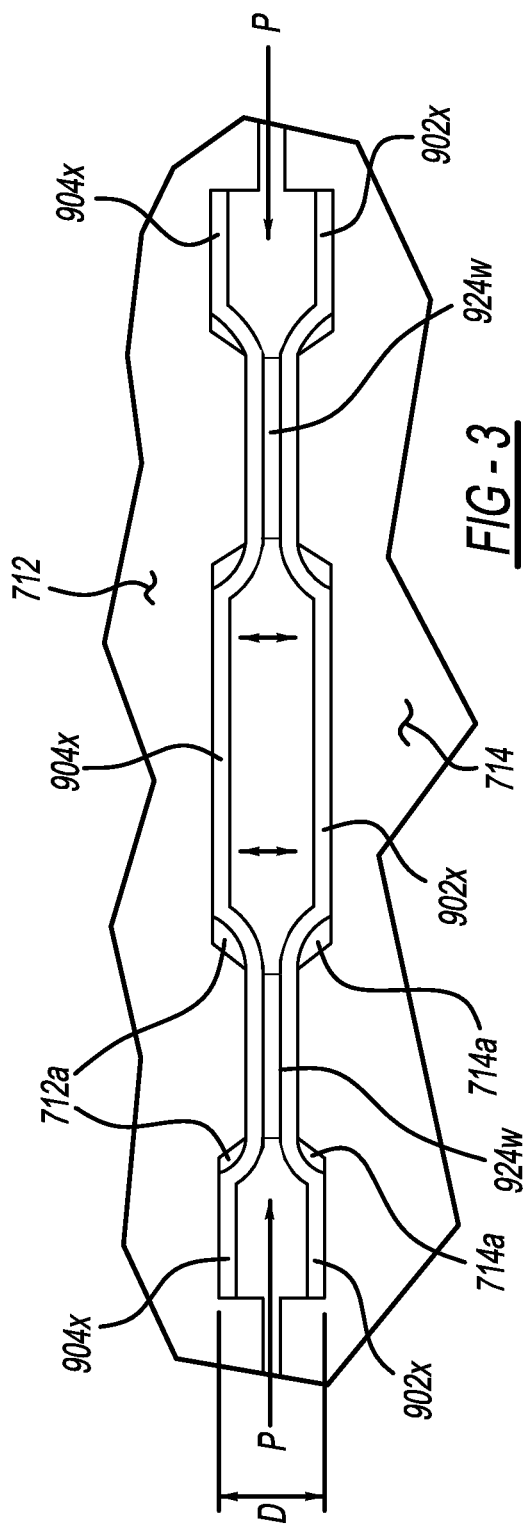
FIG-2
FIG-3

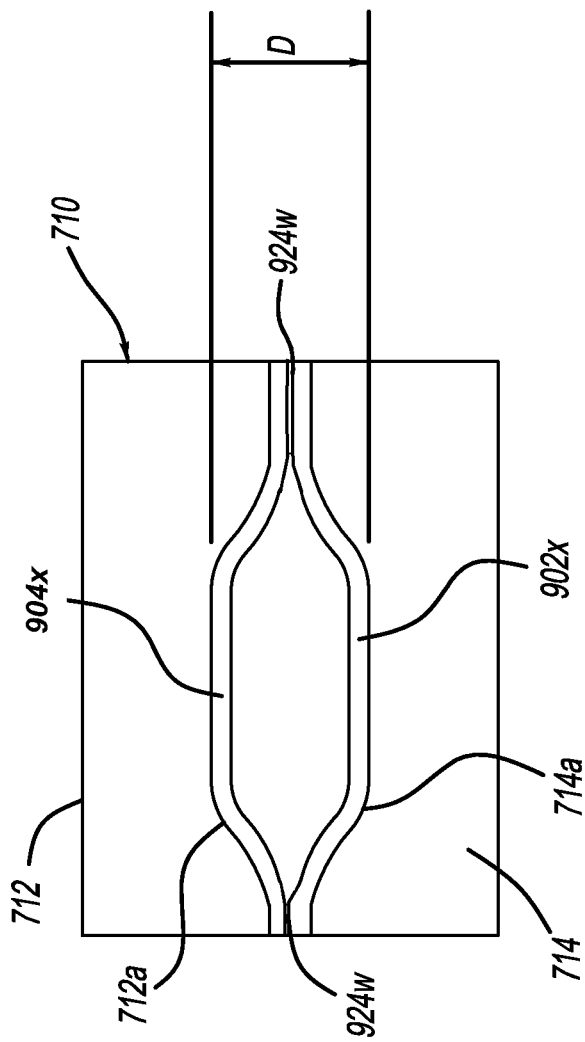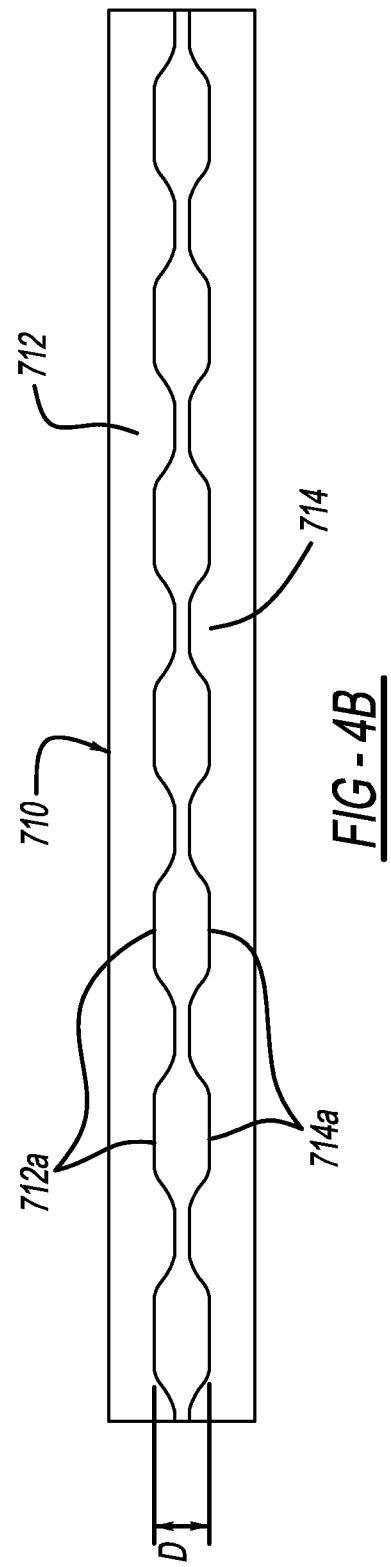
FIG-4A
FIG-4B

METHOD OF FABRICATING ROLL-BONDED EXPANDED LOAD-BEARING ALUMINUM LAMINATE STRUCTURAL ELEMENTS FOR VEHICLE

CROSS-REFERENCE TO RELATED APPLICATIONS

This application is a continuation of U.S. application Ser. No. 13/892,861 filed May 13, 2013, now abandoned, the disclosure of which is hereby incorporated in its entirety by reference herein.

BACKGROUND

There are ongoing and increasing demands for weight reduction in motor vehicles. Aluminum being significantly lighter than steel, many manufacturers are exploring the design of body-in-white (BIW) structures formed from aluminum. The stiffness required for a given application often defines the minimum gauges usable for the aluminum sheet. Sandwich aluminum structures have the potential to reduce vehicle weight drastically without compromising durability, safety and NVH performances. Conventional sandwich aluminum structures may be fabricated by stacking and joining several thin aluminum sheets where the outer layers are plain and inner layers are formed by creating plurality of cells using alternating front and rear projections. Due to the empty space provided by the core cell structure, the resulting sandwich aluminum has significantly lower density than a solid sheet metal of same overall thickness, resulting in additional weight savings. Although sandwich structures can be formed into desired part configurations, the forming pressures can collapse the cores and dramatically reduce the overall thickness of the sandwich. Thus, the overall strength, crashworthiness and stiffness of the resulting sandwich structure may be adversely affected by the required forming operations.

Thus, a need exists for beam structures and other load bearing structures which meet performance requirements and which have lower weights than existing structures.

SUMMARY

In one aspect of the embodiments described herein, a laminate includes two pieces of metallic material bonded together at a plurality of regularly spaced-apart bonded regions.

In another aspect of the embodiments described herein, a laminate includes two pieces of metallic material bonded together at a plurality of regions, each region having the same shape.

BRIEF DESCRIPTION OF THE DRAWINGS

FIG. 2 is a cross-sectional view of a section of finished laminate positioned in a portion of the die prior to injection of pressurized air between the constituent layers of the laminate.

FIG. 3 shows a cross-sectional view of a portion of the finished laminate of FIG. 2 after injection of pressurized air between the constituent layers of the laminate.

FIG. 4A is a magnified view of a portion of the view shown in FIG. 3, showing an exemplary die cavity and laminate constituents positioned therein after injection of pressurized air.

FIG. 4B is a cross-sectional view of a portion of an exemplary die incorporating multiple die cavities as shown in FIG. 4A.

DETAILED DESCRIPTION

In embodiments described herein, a basic laminate structure usable for a variety of vehicle structural components is formed from diffusion-bonded sheets of aluminum alloy. This laminate structure is stiffer and stronger than both solid aluminum sheet structures and conventional sandwich aluminum structures, and may be formed into desired configurations using conventional method. The basic laminate produced by the process described below can be used to form a wide variety of structures, including finished vehicle components and braces or reinforcements attachable to other vehicle components for use in strengthening and/or stiffening these other components.

As used herein, the terms "basic laminate" and "finished laminate" refer to a laminate comprising two pieces or strips of material bonded together as described herein, and prior to any forming or expansion operations as described below.

In embodiments of the bonding process described herein, the components usable for forming the basic laminate comprise two pieces, strips or sheets of one or more suitable aluminum alloys. Either of the laminate constituents may be formed from any aluminum alloy in the 1000, 2000, 3000, 4000, 5000, 6000 or 7000 series.

Figure 1:
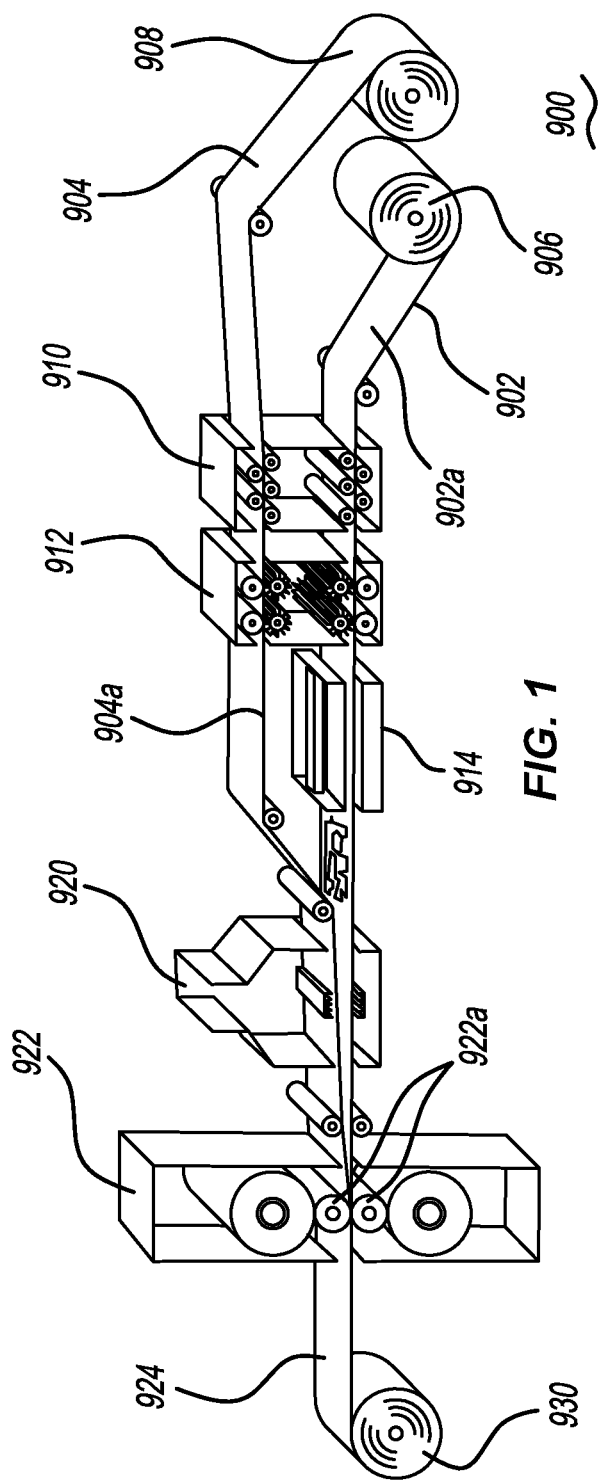
FIG. 1 is a schematic view of a production line structured for fabricating a basic laminate in accordance with the embodiments described herein.
Figure 1A:
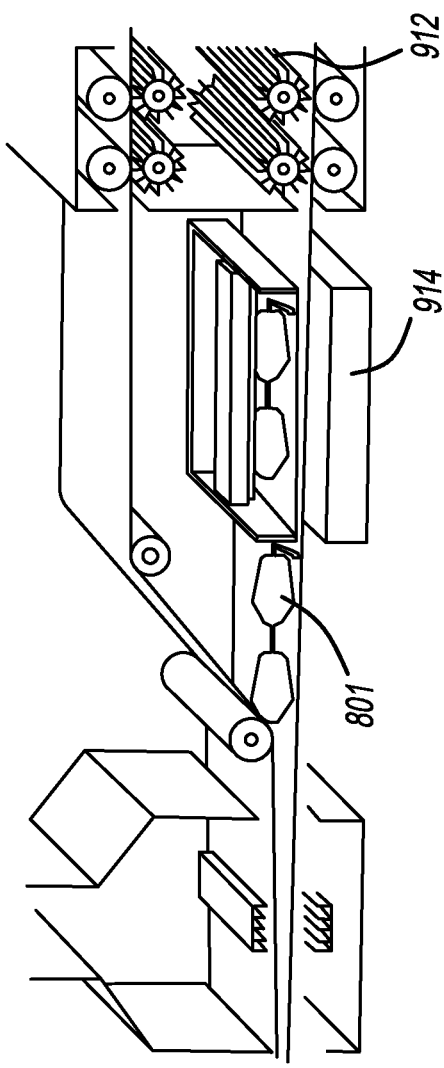
FIG. 1A is a magnified schematic view of a portion of one the production line shown in FIG. 1.

FIG. 1 is a schematic view of a production line 900 structured for fabricating a basic laminate in accordance with at least one of the embodiments described herein. Line 900 is structured to efficiently fabricate a quantity of basic laminate in a continuous process, by diffusion bonding a pair of continuous sheets 902 and 904 of aluminum alloy to each other. In a particular embodiment of the process, each of the laminate constituents 902 and 904 has a substantially uniform thickness (within thickness manufacturing tolerances for the component sheet) within a range of 0.4 mm-1.5 mm inclusive. Sheets 902 and 904 are fed by associated uncoilers (906 and 908, respectively) from rolls of aluminum sheet. The sheets are then passed through a flattener station 910 and a scratch brushing station 912 to aid in removing contaminants from the inner surfaces 902*a* and 904*a* of the sheets along which the diffusion bonds will be formed, and to roughen the surfaces to promote formation of the bonds.

In the next step of the process, a spreadable composition of relatively high temperature-resistant material (for example, graphite, aluminum oxide, or another suitable material) is selectively deposited onto at least one of the surfaces 902*a* or 904*a* of laminate components 902 and 904, respectively, to form a covered portion 801 of the component. A high temperature-resistant material is selected that will not chemically react with the surfaces to be bonded. The high temperature-resistant material is deposited (using a known technique) in a pattern that leaves exposed or uncovered the remaining portions of the surface(s). The diffusion bonds between the sheets 902 and 904 will be formed at these exposed surface portions. In the embodiment shown in FIG. 1, the high temperature-resistant material is deposited on bonding surface 902*a* of sheet 902. In one embodiment, a known silkscreen or screen printing process is used to apply the high temperature-resistant material to the selected surface at a printing station 914. However, any suitable process may be used.

Figure 1B:
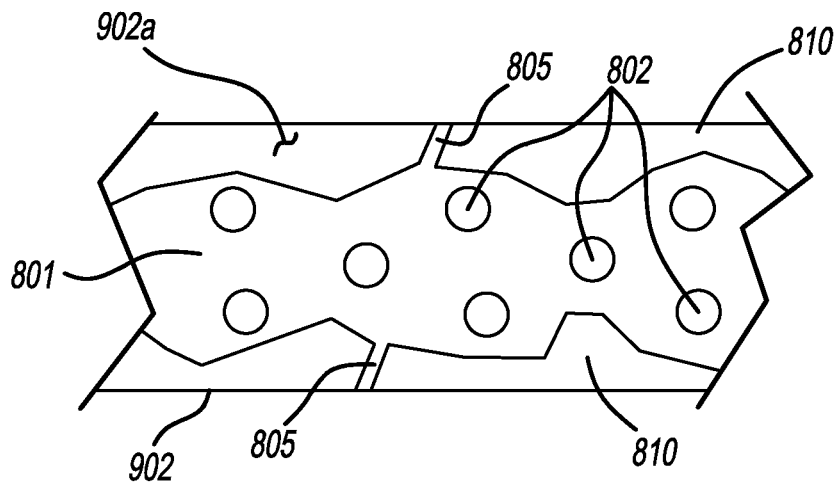
FIG. 1B is a detailed view a portion of a laminate constituent sheet after passing through a printing station.

FIG. 1B is a detailed view a portion of sheet 902 after passing through the printing station 914. This view shows one embodiment of a pattern of deposition of the high temperature-resistant material covering sheet portion 801 on bonding surface 902*a*.

In the embodiment shown in FIG. 1B, discrete circular exposed surface (i.e., exposed metal) portions 802 are separated or spaced apart by covered portion(s) 801. In addition, as shown in FIG. 1B, portions 810 of the laminate constituents 902 and 904 are left uncovered along the edges thereof (except where air flow passages 805 are to be formed as described below). These uncovered portions of the laminate components are later bonded to associated uncovered portions of sheet 904 to prevent escape of pressurized air from between the bonded laminate sheets 902 and 904, and to form flanges 934 and 936 bonded to associated edges of sheet 904 and which can be riveted, welded or otherwise suitably attached to another piece of laminate or to another vehicle component.

In addition, high temperature-resistant material is also deposited such that the covered portion 801 of the laminate constituent includes one or more paths 805 connecting one or more associated edges of the laminate with the other covered regions of the laminate constituent 902. After application of bonding pressure, these covered paths later form unbonded air paths or passages between bonded portions of the laminate sheets 902 and 904. Thus, the coated portions 801 and 810 of the surface 902*a* are interconnected in a continuous pattern extending from the edges of the laminate constituent sheet 902 into and through the central portions of the sheet.

Although FIG. 1B shows one embodiment of particular patterns and shapes of covered portions 801 and exposed portions 802, any other desired pattern or arrangement of covered portions and exposed portions may be employed, depending on the requirements of a particular application. For example, the high temperature-resistant material can be applied or deposited on the bonding surfaces of the laminate constituent sheets 902 and 904 in shapes of ellipses, rectangles, circular or serpentine structures and/or any of numerous other shapes and/or any combinations thereof. In a particular embodiment, the exposed surface portions 802 are generally circular in shape as shown in FIG. 1B. However, the exposed surface portions and the adjacent covered portions 801 of the surfaces may have any shape or shapes (for example, ellipses, rectangles, serpentine or other shapes) that can be applied to the laminate component surface(s) using a suitable process. The applied pattern of unbonded material on sheet 902 forms, when bonded in a later step to sheet 904, a network of air flow channels extending between the laminate constituent sheets 902 and 904, from the edges of the finished laminate and through the central portions of the laminate. These passages permit a flow of pressurized air between the laminate sheets 902 and 904 for inflating or expanding the laminate structure, as described below.

FIGS. 10-15 show embodiments of deposition patterns high temperature-resistant material deposited on a bonding surface of at least one of sheets 902 and 904. In each of the patterns shown in FIGS. 10-15, the individual exposed regions of metal surface have the same shapes and overall dimensions, within the limits of fabrication and bonding process tolerances. However, in other pattern embodiments, the individual exposed regions within each pattern may have differing shapes and/or dimensions, according to the requirements of a particular application.

As used herein, the term "regularly spaced apart" as applied to the exposed bonding regions formed on a bonding surface of a laminate constituent is understood to mean that the centers of all regions lying on a straight line extending from the center of any given region are spaced apart the same distance from each other.

In general the parameters of a given deposition pattern (such as the shapes of the exposed regions of high temperature-resistant material, the dimensions of the exposed regions, the spacing between the exposed regions, the distances of the exposed regions from the edges of the constituent sheet on which they are formed, and any other parameters pertinent to the particular pattern of deposition) will be selected so as to impart a strength and/or stiffness within a desired range to a part formed from the finished laminate.

Generally the stiffness and strength of a piece of finished pressure roll-bonded laminate 294 will depend on the ratio of the total unbonded area to the total bonded area of the piece. Typically, a relatively higher proportion of unbonded area will provide a relatively higher strength and stiffness. Thus, the ranges of strength and stiffness may be controlled or "tuned" by modifying the unbonded/bonded area ratio. To maximize the strength and stiffness, it is generally desirable to minimize the net or total bonded area. However, the total bonded area should also be sufficiently large to hold the laminate constituents together along the bonded portions of the constituents during expansion of the laminate.

The practical maximum value of the unbonded/bonded area ratio for a given deposition pattern may be determined experimentally by adjusting one or more of the various parameters of the deposition pattern, including the dimensions of the deposited regions of high temperature-resistant material, the spacing between the regions, the distances of the regions from the edges of the constituent sheet on which they are deposited, and any other parameters pertinent to the particular pattern of deposition.

In particular embodiments, where the bonded regions in a finished laminate have the same shapes and overall dimensions, exposed regions of the laminate constituents are configured such that the maximum spacing between adjacent bonded regions of the finished laminate will be equal to a maximum overall dimension of an exemplary bonded region.

Figure 10:
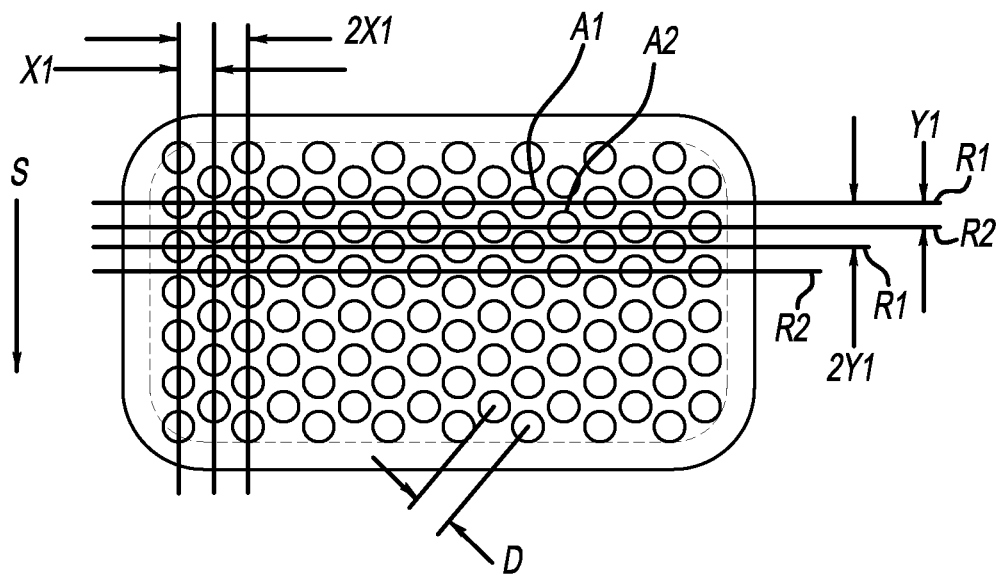
FIG. 10 is a schematic view of a deposition pattern in accordance with one particular embodiment.

FIG. 10 shows a schematic view of a deposition pattern in accordance with one particular embodiment. In FIG. 10, the high temperature-resistant material is deposited on the surface of at least one of the laminate constituents so as to leave exposed an array of darkened circular areas A1 as shown. Thus, the high temperature-resistant material resides in the regions surrounding the circular areas A1. The array includes multiple rows and columns of circular exposed areas, which form, when the laminate constituents are bonded together, corresponding circular bonded regions holding together the laminate constituents. The rows include multiple rows R1 of circular areas A1 and multiple rows R2 of circular areas A2. All areas A1 may be equal to each other, and all areas A2 may be equal to each other, within the limitations of the deposition process. Also, all the areas A1 and A2 may have the same values, within the limitations of the deposition process.

The centers of areas A1 along a given row R1 are collinear, and the centers of areas A2 along a given row R2 are collinear. Rows R1 and R2 are arranged in alternating fashion along a direction S extending perpendicular to a line connecting the centers of the circular areas positioned along a given row. Each row R1 is spaced apart a distance Y1 from an adjacent row R2, and a distance 2Y1 from another adjacent row R1. Adjacent centers of areas A1 along any given row R1 are spaced apart a distance 2X1, and adjacent centers of areas A2 along any given row R2 are spaced apart a distance 2X1. The center of each area A2 in a row R2 is spaced apart from a center of an area A1 in an adjacent row R1 a distance D, where D is given by the relation:

$$D=(X1^2+Y1^2)^{1/2}$$

Although the embodiment of FIG. 10 shows an arrangement of six rows R2 interspersed with seven rows R1, a lesser or greater number of rows, columns, or circular exposed areas may be incorporated into a given arrangement of exposed areas, depending on the requirements of a particular application.

Figure 11:
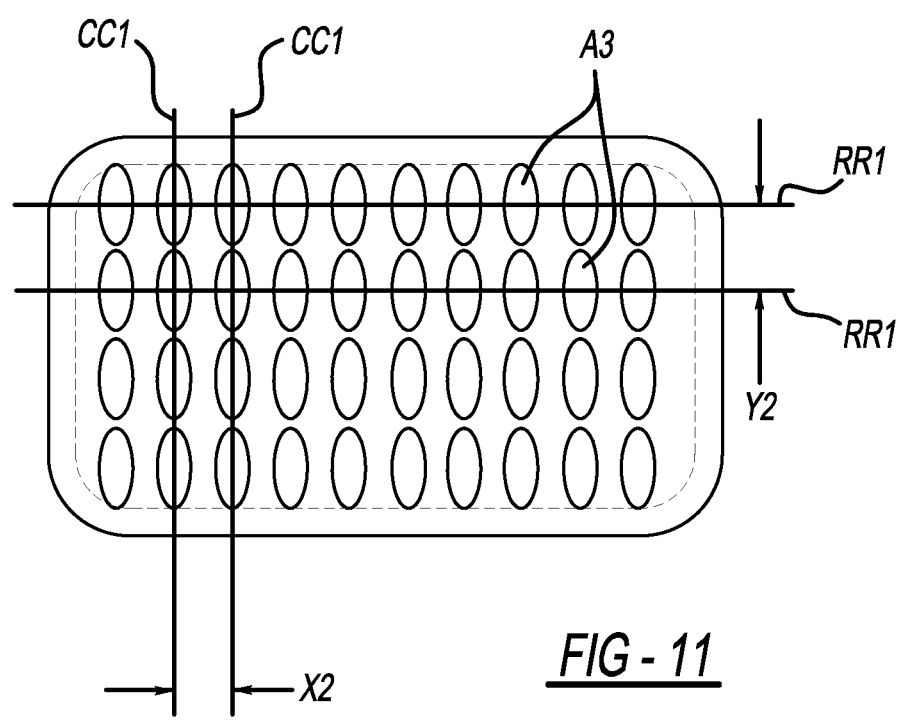
FIG. 11 shows a schematic view of a deposition pattern in accordance with another particular embodiment.

FIG. 11 shows a schematic view of a deposition pattern in accordance with another particular embodiment. In FIG. 11, the high temperature-resistant material is deposited on the surface of the laminate constituent so as to leave an array of elliptical exposed areas A3 arranged in columns CC1 and rows RR1 which form, when the laminate constituents are bonded together, corresponding elliptical bonded regions holding together the laminate constituents. Thus, the high temperature-resistant material resides in the regions surrounding the elliptical exposed areas A3. Semi-major axes of the ellipses in each column CC1 are arranged collinearly, and semi-minor axes of the ellipses in each row RR1 are arranged collinearly. The lines along which the semi-major axes of the ellipses in adjacent columns CC1 extend are spaced apart a distance X2, and the lines along which the semi-minor axes of the ellipses in adjacent rows RR1 extend are spaced apart a distance Y2. Also, all the areas A3 may have the same values, within the limitations of the deposition process. Although the embodiment of FIG. 11 shows an arrangement of four rows RR1 and ten columns CC1 of elliptical exposed areas, a lesser or greater number of rows, columns, or elliptical exposed areas may be incorporated into a given arrangement of exposed areas, depending on the requirements of a particular application.

Figure 12:
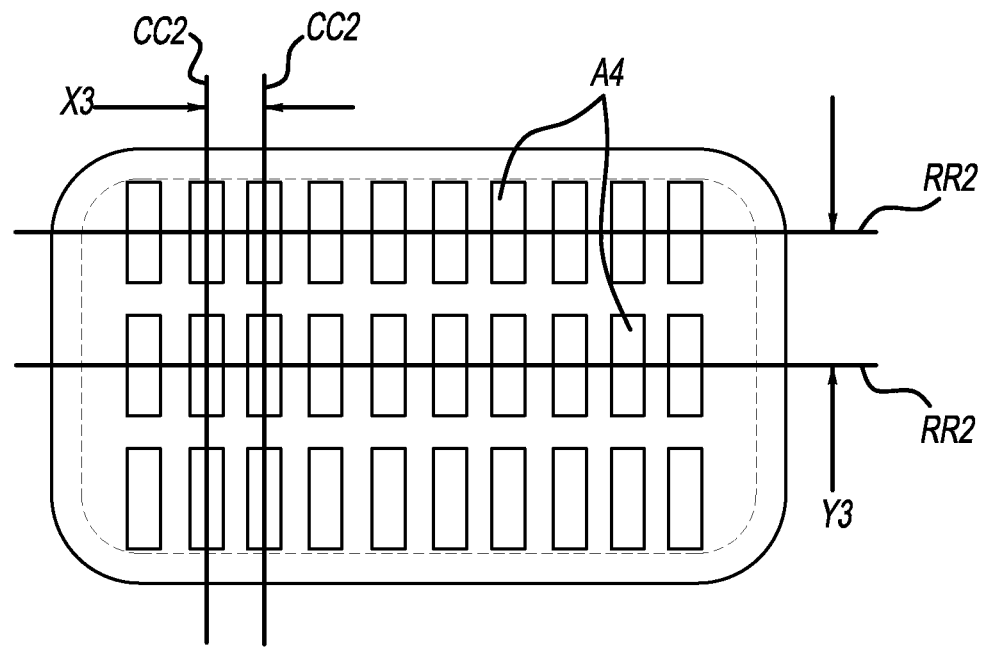
FIG. 12 shows a schematic view of a deposition pattern in accordance with another particular embodiment.

FIG. 12 shows a schematic view of a deposition pattern in accordance with another particular embodiment. In FIG. 12, the high temperature-resistant material is deposited on the surface of the laminate constituent so as to leave an array of exposed rectangular areas A4 arranged in columns CC2 and rows RR2 which form, when the laminate constituents are bonded together, corresponding rectangular bonded regions holding together the laminate constituents. Thus, the high temperature-resistant material resides in the regions surrounding the rectangular exposed areas A4. Centers of the rectangular areas in each column CC2 are arranged collinearly, and centers of the rectangular areas in each row RR2 are arranged collinearly. The lines along which the centers of the rectangular areas in adjacent columns CC2 extend are spaced apart a distance X3, and the lines along which the centers of the rectangular areas in adjacent rows RR2 extend are spaced apart a distance Y3. Also, all the areas A4 may have the same values, within the limitations of the deposition process. Although the embodiment of FIG. 12 shows an arrangement of three rows RR2 and ten columns CC2 of rectangular exposed areas, a lesser or greater number of rows, columns, or rectangular exposed areas may be incorporated into a given arrangement of exposed areas, depending on the requirements of a particular application.

Figure 13:
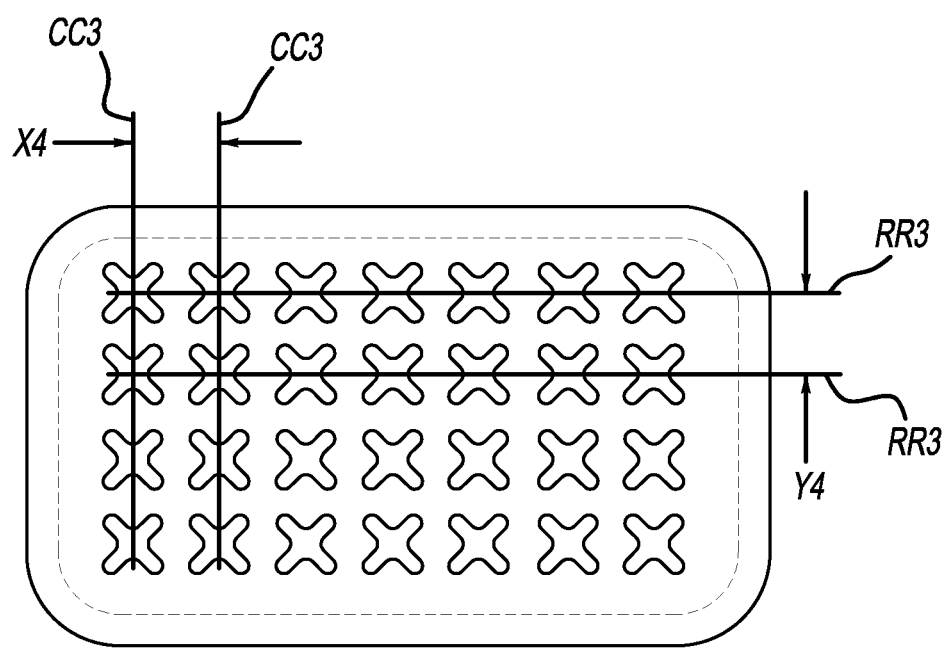
FIG. 13 shows a schematic view of a deposition pattern in accordance with another particular embodiment.

FIG. 13 shows a schematic view of a deposition pattern in accordance with another particular embodiment. In FIG. 13, the high temperature-resistant material is deposited on the surface of the laminate constituent so as to leave an array of exposed cross-shaped areas A5 arranged in columns CC3 and rows RR3 which form, when the laminate constituents are bonded together, corresponding cross-shaped bonded regions holding together the laminate constituents. Thus, the high temperature-resistant material resides in the regions surrounding the cross-shaped exposed areas A5. Centers of the cross-shaped areas in each column CC3 are arranged collinearly, and centers of the cross-shaped areas in each row RR3 are arranged collinearly. The lines along which the centers of the cross-shaped areas in adjacent columns CC3 extend are spaced apart a distance X4, and the lines along which the centers of the cross-shaped areas in adjacent rows RR3 extend are spaced apart a distance Y4. Also, all the areas A5 may have the same values, within the limitations of the deposition process. Although the embodiment of FIG. 13 shows an arrangement of four rows RR3 and seven columns CC3 of cross-shaped exposed areas, a lesser or greater number of rows, columns, or cross-shaped exposed areas may be incorporated into a given arrangement of exposed areas, depending on the requirements of a particular application.

Figure 14:
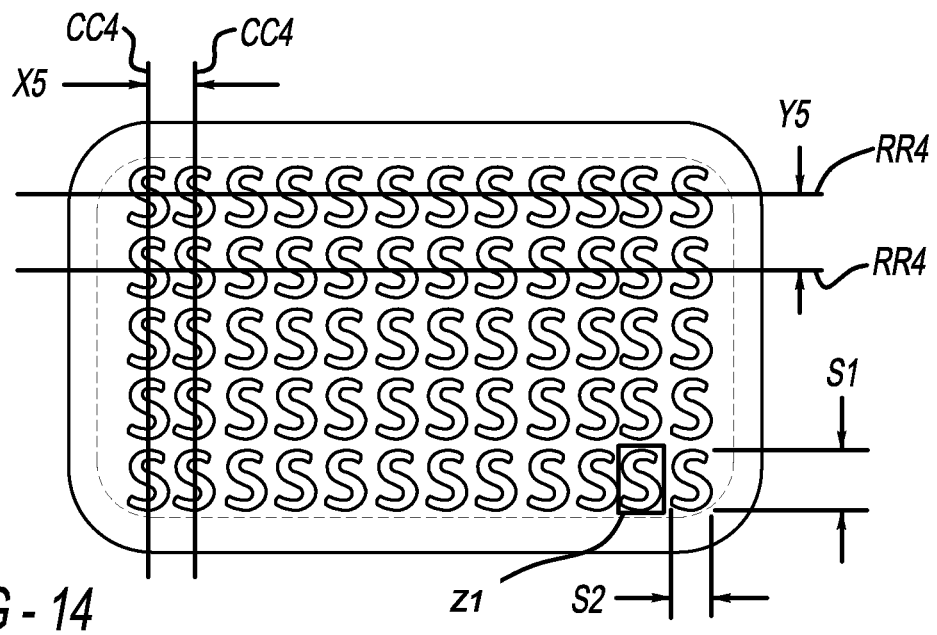
FIG. 14 shows a schematic view of a deposition pattern in accordance with another particular embodiment.

FIG. 14 shows a schematic view of a deposition pattern in accordance with another particular embodiment. In FIG. 14, the high temperature-resistant material is deposited on the surface of the laminate constituent so as to leave an array of exposed "S"-shaped areas A6 arranged in columns CC4 and rows RR4 which form, when the laminate constituents are bonded together, corresponding "S"-shaped bonded regions holding together the laminate constituents. Thus, the high temperature-resistant material resides in the regions surrounding the "S"-shaped exposed areas A6. In the embodiment shown in FIG. 14, all of the "S"-shaped areas A6 have the same size, within the limitations of the deposition process. An envelope size of a representative "S"-shaped areas is a rectangular area Z1 defined by the maximum dimension S1 of the "S"-shape in a first direction (in FIG. 14, the direction in which rows RR4 extend) and the maximum dimension S2 of the "S"-shape in a second direction extending perpendicular to the first direction.

Centers of the rectangular areas Z1 of the S"-shape areas in each column CC4 are arranged collinearly, and centers of the rectangular areas Z1 of the S"-shape areas in each row RR4 are arranged collinearly. The lines along which the centers of the rectangular areas Z1 in adjacent columns CC4 extend are spaced apart a distance X5, and the lines along which the centers of the cross-shaped areas in adjacent rows RR4 extend are spaced apart a distance Y5. Although the embodiment of FIG. 14 shows an arrangement of five rows RR4 and twelve columns CC4 of S"-shaped exposed areas, a lesser or greater number of rows, columns, or S"-shaped exposed areas may be incorporated into a given arrangement of exposed areas, depending on the requirements of a particular application.

Figure 15:
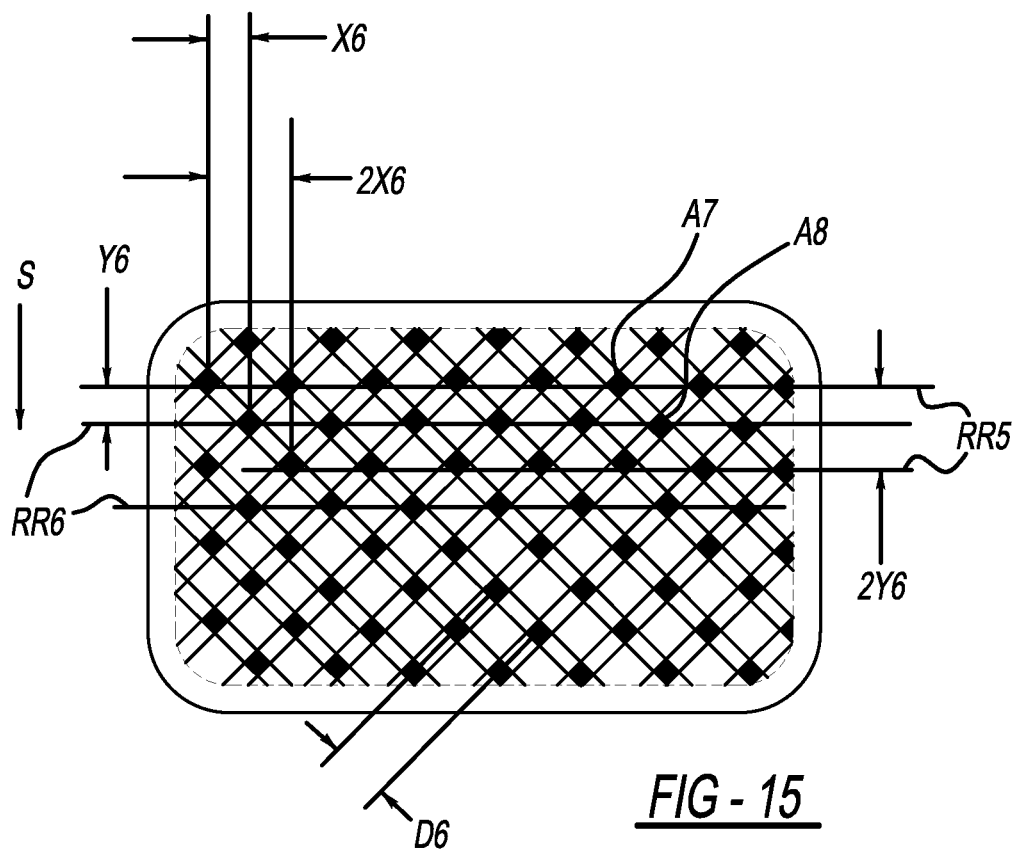
FIG. 15 shows a schematic view of a deposition pattern in accordance with another particular embodiment.

FIG. 15 shows a schematic view of a deposition pattern in accordance with one particular embodiment. In FIG. 15, the high temperature-resistant material is deposited on the surface of the laminate constituent so as to leave exposed an array of square-shaped areas as shown and which form, when the laminate constituents are bonded together, corresponding square-shaped bonded regions holding together the laminate constituents. Thus, the high temperature-resistant material resides in the regions surrounding the square-shaped areas A7 and A8. The array includes multiple rows and columns of square-shaped exposed areas. The rows include multiple rows RR5 of square-shaped areas A7 and multiple rows RR6 of square-shaped areas A8. All areas A7 may be equal to each other, and all areas A8 may be equal to each other, within the limitations of the deposition process. Also, all the areas A7 and A8 may have the same values, within the limitations of the deposition process.

The centers of areas A7 along a given row RR5 are collinear, and the centers of areas A8 along a given row RR6 are collinear. Rows RR5 and RR6 are arranged in alternating fashion along a direction S extending perpendicular to a line connecting the centers of the square-shaped areas positioned along a given row. Each row RR5 is spaced apart a distance Y6 from an adjacent row RR6, and a distance 2Y6 from another adjacent row RR5. Each row RR6 is spaced apart a distance 2Y6 from an adjacent row RR6. Adjacent centers of areas A7 along any given row RR5 are spaced apart a distance 2X6, and adjacent centers of areas A8 along any given row RR6 are spaced apart a distance 2X6. The center of each area A8 in a row RR6 is spaced apart from a center of an area A7 in an adjacent row RR5 a distance D6, where D6 is given by the relation:

$$D6=(X6^2+Y6^2)^{1/2}$$

Although the embodiment of FIG. 15 shows a particular number of rows RR6 interspersed with a particular number of rows RR5, a lesser or greater number of rows, columns, or square-shaped exposed areas may be incorporated into a given arrangement of exposed areas, depending on the requirements of a particular application.

In certain instances, application of pressure to the laminate components 902, 904 at elevated temperatures may facilitate diffusion bonding of the abutting laminate component surfaces 902a and 904a to each other, thereby reducing the bonding pressure required to achieve the desired bond strength. Thus, it may be desired to pre-heat the components 902 and 904 prior to application of bonding pressure. For this purpose, as seen in FIG. 1, line 900 may incorporate a heating station 920 usable for pre-heating the laminate components 902 and 904 after the screening operation and prior to application of pressure.

In the embodiment shown in FIG. 1, heating station 920 is a continuous furnace configured for heating the laminate constituents to a desired pre-heat temperature prior to application of pressure. However, any other suitable type of furnace or heat source may be used. In certain embodiments, the sheets 902 and 904 are heated to a temperature within the range of 300-580° C., depending on the alloy or alloys being bonded, the desired bond strength, and other pertinent factors. In cases where it is not desired or needed to heat the laminate components prior to application of pressure, the furnace or heating station may be shut down.

In particular embodiments of the laminate fabrication process, a known flux material (for example, a potassium aluminum fluoride flux)(not shown) may be applied to one or more of the abutting surfaces 902a, 904a of the laminate components 902 and 904 prior to application of pressure, to loosen and/or remove oxides from the abutting surfaces. By aiding in oxide removal, application of the flux may enhance diffusion rates in the laminate components, thereby enabling a further reduction in the pressure required to achieve a desired bond strength.

Figure 1C:
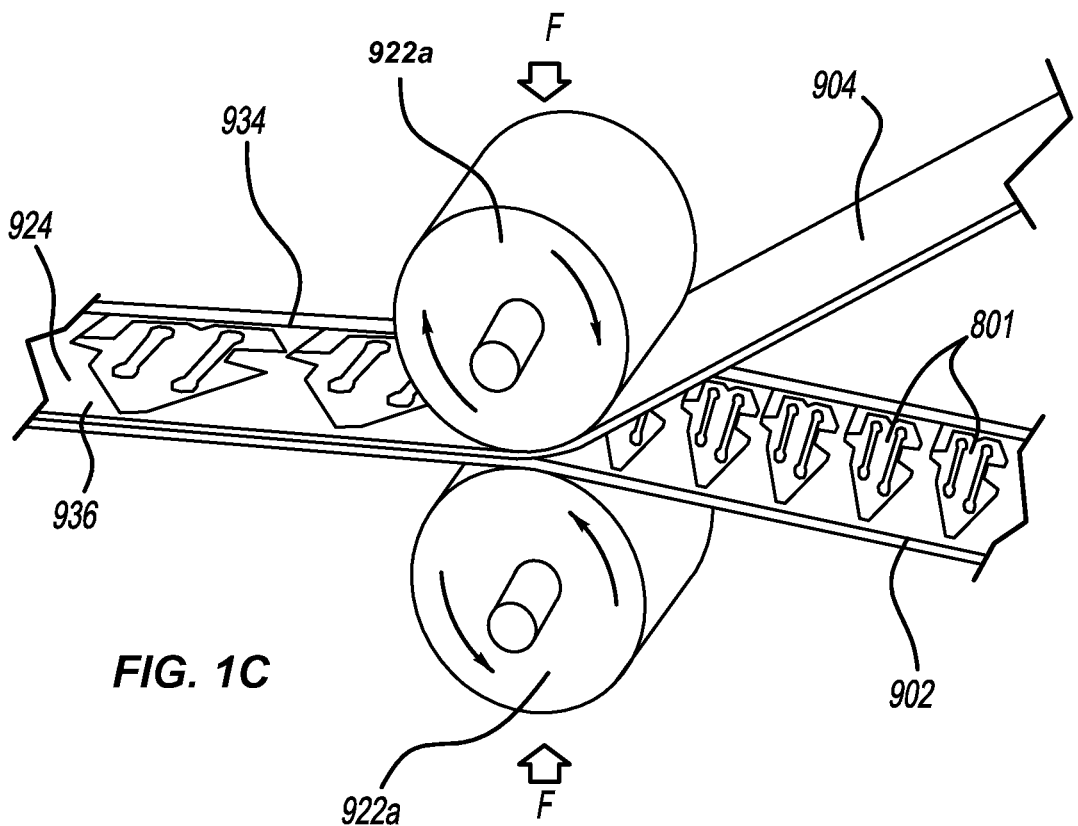
FIG. 1C shows a detailed schematic view of laminate constituents passing through rollers.

Line 900 is structured to apply pressure (and, optionally, elevated temperatures) required to diffusion bond exposed portions surfaces 902a and 904a together. For this purpose, a bonding station 922 is provided close to the area where the pre-heated laminate components 902 and 904 leave the heating station 920. In the line embodiment shown in FIG. 1, the required bonding pressure is applied by a suitably configured set of rollers (generally designated 922a) between which the laminate components 902 and 904 are passed, in a known manner. However, other methods of applying the required bonding pressure may also be used. FIG. 1C shows a detailed schematic view of laminate constituents 902 and 904 passing through the rollers. The speed at which laminate constituents 902 and 904 are fed through the rollers 922a, the pressure applied by the rollers, and other line operating parameters are adjustable to apply sufficient pressure to achieve a diffusion bond of a desired strength between laminate constituents at a given temperature, in a manner known in the art. Thus, the process line 900 may be adapted to bond together sheets formed from any of a variety of alloys.

During application of bonding pressure to the abutting sheets 902 and 904, the constituent layers of the laminate are diffusion bonded to each other at the exposed portions 802 and 810 of the surfaces, while the coated portions 801 of the surface 902a remain unbonded to surface 904a of sheet 904. The elevated temperature of the exposed metal regions facilitates the formation under pressure of diffusion bonds between the various exposed metal surfaces. As stated previously, these bonded edge portions 810 of the finished laminate form flanges 934 and 936 which can be riveted, welded or otherwise suitably attached to another piece of laminate or to another vehicle component.

FIG. 1B shows a magnified schematic view of laminate constituents 902 and 904 passing through rollers 922a. Also, after passing between rollers 922a, the thickness of the finished laminate 924 may be up to 60% less than the combined thicknesses of the sheets 902 and 904 prior to application of the bonding pressure. In addition, compression of the laminate constituent sheets 902 and 904 during application of bonding pressure produces a longitudinal (in the material feed direction) and lateral (transverse to the material feed direction) "spreading" of the laminate sheets which results in an increase in the overall size of the pattern defining the unbonded regions of the laminate. In particular embodiments, the total thickness of the finished laminate 924 leaving the pressure-application station of the line 900 is in the range of 0.8 millimeter (mm) to 3.0 mm inclusive.

The finished basic laminate 924 may be wound onto a take-up roller or recoiler 930, as shown in FIG. 1. A section of finished laminate 924 may now be cut from the roll for forming, cutting or shaping into a desired part shape prior to the inflation or expansion step. A section of the finished laminate may be formed using known techniques into any of a variety of complex shapes as desired. Even deep drawn pats can be formed from the laminate.

In the next step, the formed section of finished laminate is secured in a suitably shaped die 710 in which pressurized air is introduced between the laminate constituent layers 902 and 904 to expand or inflate the finished laminate. The die 710 is configured to enable high-pressure air to be injected from the edges of the finished laminate piece between constituent layers 902 and 904 via passage(s) formed along the unbonded edge portions 805 of the laminate layers.

FIG. 2 is a cross-sectional view of a section of finished laminate 924 positioned in a portion of the die 710 prior to injection of pressurized air between the constituent layers 902 and 904. In the embodiment shown, die 710 has a first portion 712 and a second portion 714. first portion 712 has a plurality of cavities 712a formed along interior surfaces thereof, and dies second portion 714 has a plurality of cavities 714a formed along interior surfaces thereof, each cavity 714a being positioned opposite an associated one of cavities 712a. These cavities 712a, 714a are configured to permit expansion of the unbonded portions 902x, 904x of the laminate constituents 902 and 904 therein during application of the pressurized air. That is, the die cavities 712a, 714a are positioned so as to correspond to or overlie the unbonded portions 902x, 904x of the final laminate piece 924 when the laminate piece is positioned in the die. Similarly, the portions of the die surrounding the cavities 712a, 714a are configured so as to correspond to or overlie the bonded portions 924w of the laminate piece. These portions of the die act to brace or support the bonded portions 924w of the laminate against the forces exerted by the pressurized air, thereby minimizing the stresses on the bonded portions.

FIGS. 3 and 4A show the cross-sectional views of portions of FIG. 2 after injection of pressurized air between the constituent layers 902 and 904. FIG. 4B is a cross-sectional view of a portion of an exemplary die incorporating cavities as shown in FIG. 4A, and prior to placement of laminate constituents 902 and 904 therein. As seen from FIGS. 2-4B, as the pressurized air P is introduced into passage(s) 805, the air flows between the laminate constituents 902 and 904 along interconnected passages defined by the unbonded regions of the laminate. The interconnected unbonded portions of the expanded laminate residing between the bonded portions thus combine to form a continuous unbonded region extending around the bonded regions. This airflow causes the unbonded portions of the laminate along both constituents 902 and 904 expand into the die cavities 712a, 714a along each side of the die. In this manner, the laminate piece 924 is inflated or expanded. The expansion process increases the overall effective thickness of the finished laminate piece. In particular embodiments, the final overall part thickness D is within the range 4.0 mm-8.0 mm.

The air pressure needed for inflating or expanding the laminate structure after forming will depend on such factors as the thickness(es) of the laminate components 902 and 904, the geometry of the formed part, the yield strength of the alloy(s) used for the laminate, and other pertinent factors. Typical inflation pressures may be in the range 20 MPa to 200 MPa.

Figure 5:
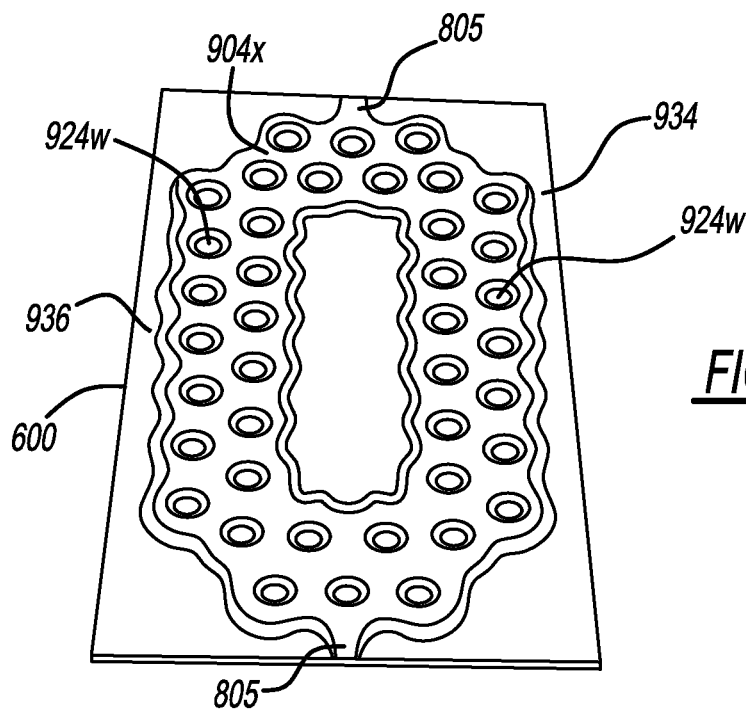
FIG. 5 shows a perspective view of one embodiment of a part formed from a piece of expanded laminate.
Figure 8A:
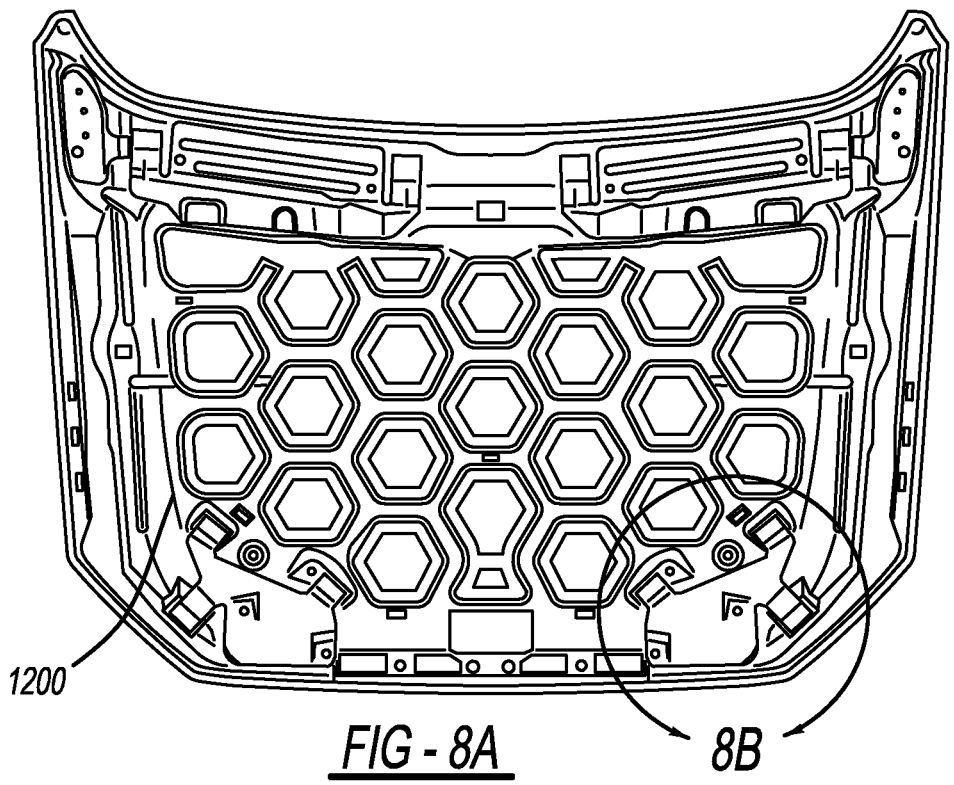
FIG. 8A shows a schematic view of a part formed from a piece of expanded laminate in accordance with one of the embodiments described herein, attached to an interior of a vehicle hood as a hood reinforcement.
Figure 8B:
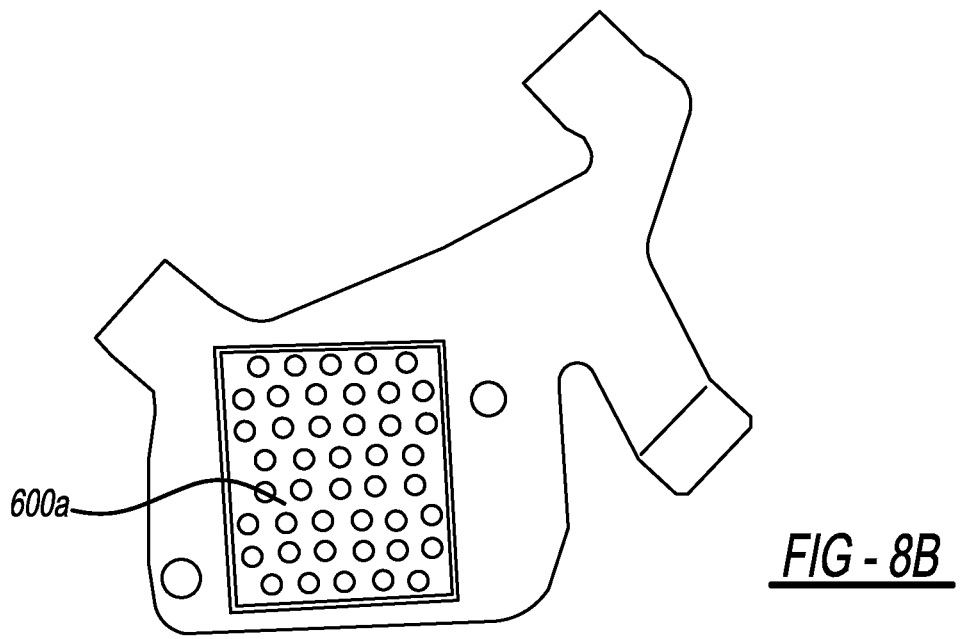
FIG. 8B shows a schematic view of a part formed from a piece of expanded laminate in accordance with one of the embodiments described herein, attached to an interior of a vehicle hood as a hood reinforcement.

FIG. 5 shows one embodiment of a finished (in an expanded or post-inflation state) part 600 structured for use as a reinforcing plate for another portion (not shown) of the vehicle. Part 600 may be secured to other portion of portions of the vehicle along flanges 934 and 936. FIGS. 8A and 8B show a part 600a constructed in a manner similar to that of part 600 attached to an interior of a vehicle hood 1200 as a reinforcing member.

Figure 9A:
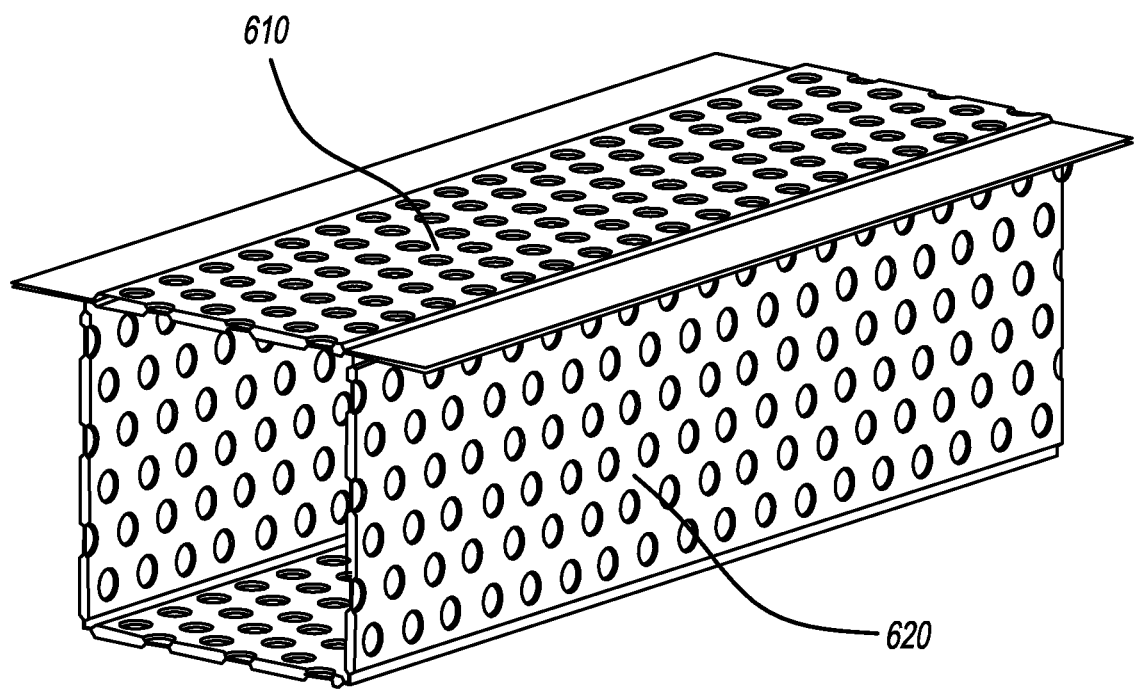
FIG. 9A is a perspective view of two pieces of expanded finished laminate after forming into shapes suitable for use in fabricating an energy-absorbing crush can.
Figure 9B:
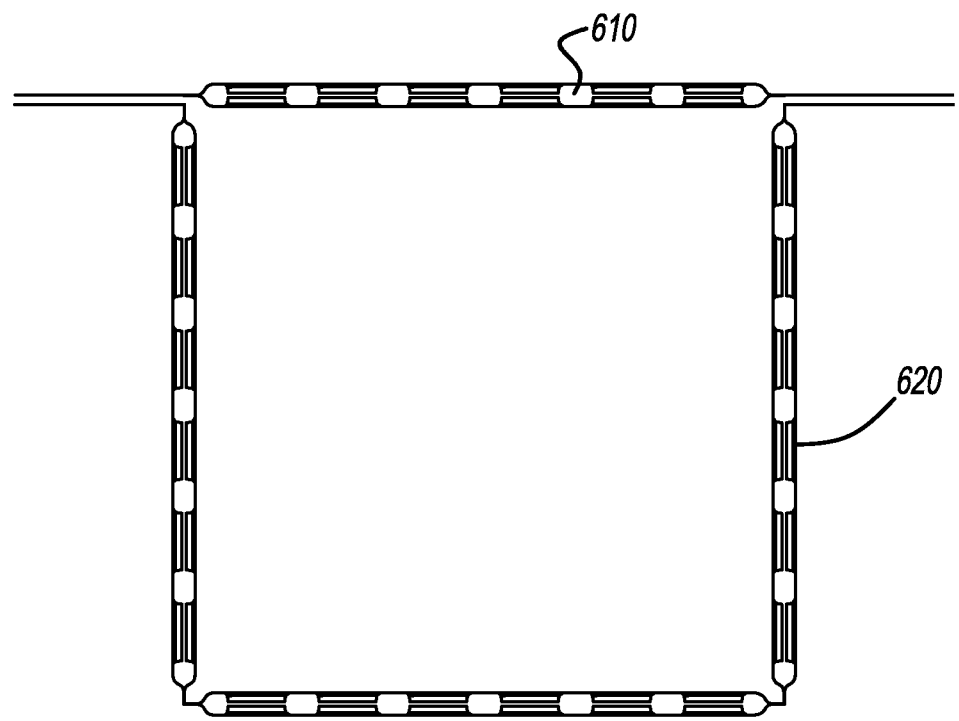
FIG. 9B shows a cross-sectional end view of the can of FIG. 9A.
Figure 9C:
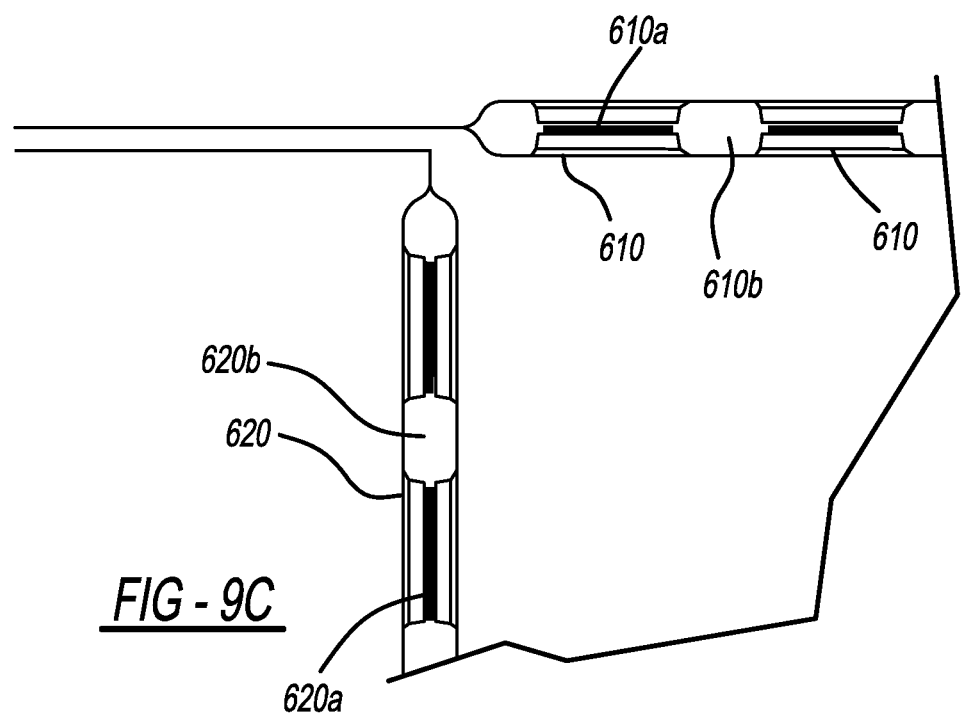
FIG. 9C shows a detailed cross-sectional end view of a portion of the can shown in FIG. 9B.

In another embodiment (shown in FIGS. 9A-9C), one or more pieces 610 and 620 of finished laminate 924 are formed so as to able their combination into a box-shaped crush can 630 after the pieces have been inflated. FIG. 9A is a perspective view of two pieces 610 and 620 of expanded or inflated finished laminate after forming into shapes suitable for use in fabricating an energy-absorbing crush can 630. Part 620 is bent prior to expansion to form a pair of right angle bends 622 and 624, while part 610 is formed from a flat expanded piece of finished laminate. FIG. 9B shows a cross-sectional end view of the can of FIG. 9A. FIG. 9C shows a detailed cross-sectional end view of a portion of the can shown in FIG. 9B. This view clearly shows the bonded portions 610a and 620a of the parts 610 and 620, and also the unbonded and expanded portions 610b and 620b of the parts.

Novel applications of embodiments of the pressure roll-bonded aluminum laminate described herein include BIW and closure structures currently fabricated using solid aluminum sheets. Other collision-critical structural applications for the expanded laminate include light-weight bumpers, B-pillars, vehicle floor cross members, roof bows, and numerous other applications. Other possible applications include hood reinforcements, dash reinforcements, floor reinforcements, and any other applications where stiffness is required without a high weight penalty.

EXAMPLES

Figure 16:
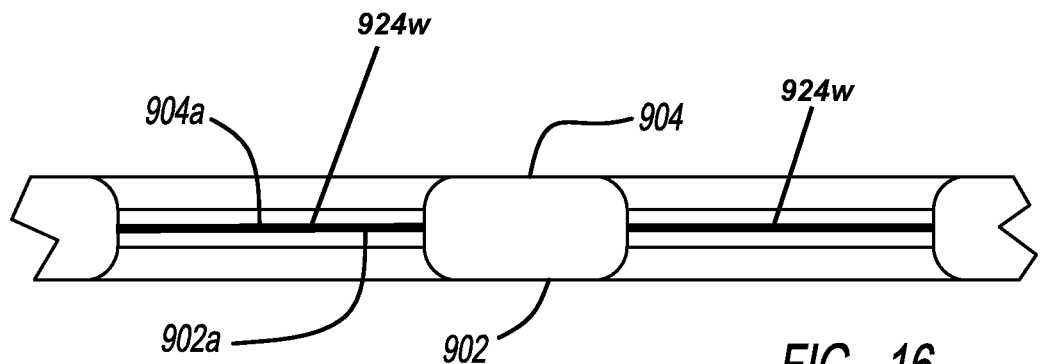
FIG. 16 is a detailed cross-sectional view of a portion of a test specimen formed from an exemplary embodiment of the finished laminate.

Referring to FIG. 16, to evaluate the relative stiffness and strength of the finished laminate with respect to alternative aluminum and steel structures, a finished test laminate was used to construct crush-can 1000 having a structure similar to that shown in FIGS. 9A-9C constructed with two sheets of 0.625 mm thick aluminum alloy 5754 as the laminate constituents 902 and 904 bonded at a plurality of spaced apart circular bonding areas, using the method previously described. Similarly-structured cans were fabricated from 0.8 mm thick low carbon mild steel and 1.8 mm thick aluminum alloy 5754.

The diameters of the circular bonding regions at non-bonding surfaces of the constituent sheets (i.e., at surfaces of the sheets opposite the bonding surfaces 902a and 904a) were about 10.125 mm. The diameters of the circular bonding regions at bonding surfaces of the constituent sheets were about 8 mm. The centers of the circular bonding regions were spaced about 13.6 mm from each other along the extent of the laminate. The spacing between the unbonded portions of the bonding surfaces 902a and 904a of the finished laminate was about 3.225 mm. During loading, one end 1000a of the crush can was constrained by a stationary rigid wall 1010, while an opposite end 1000b of the can 1000 was loaded using a rigid wall 1012 moving at 10 m/s (about 22.4 MPH).

Figure 6:
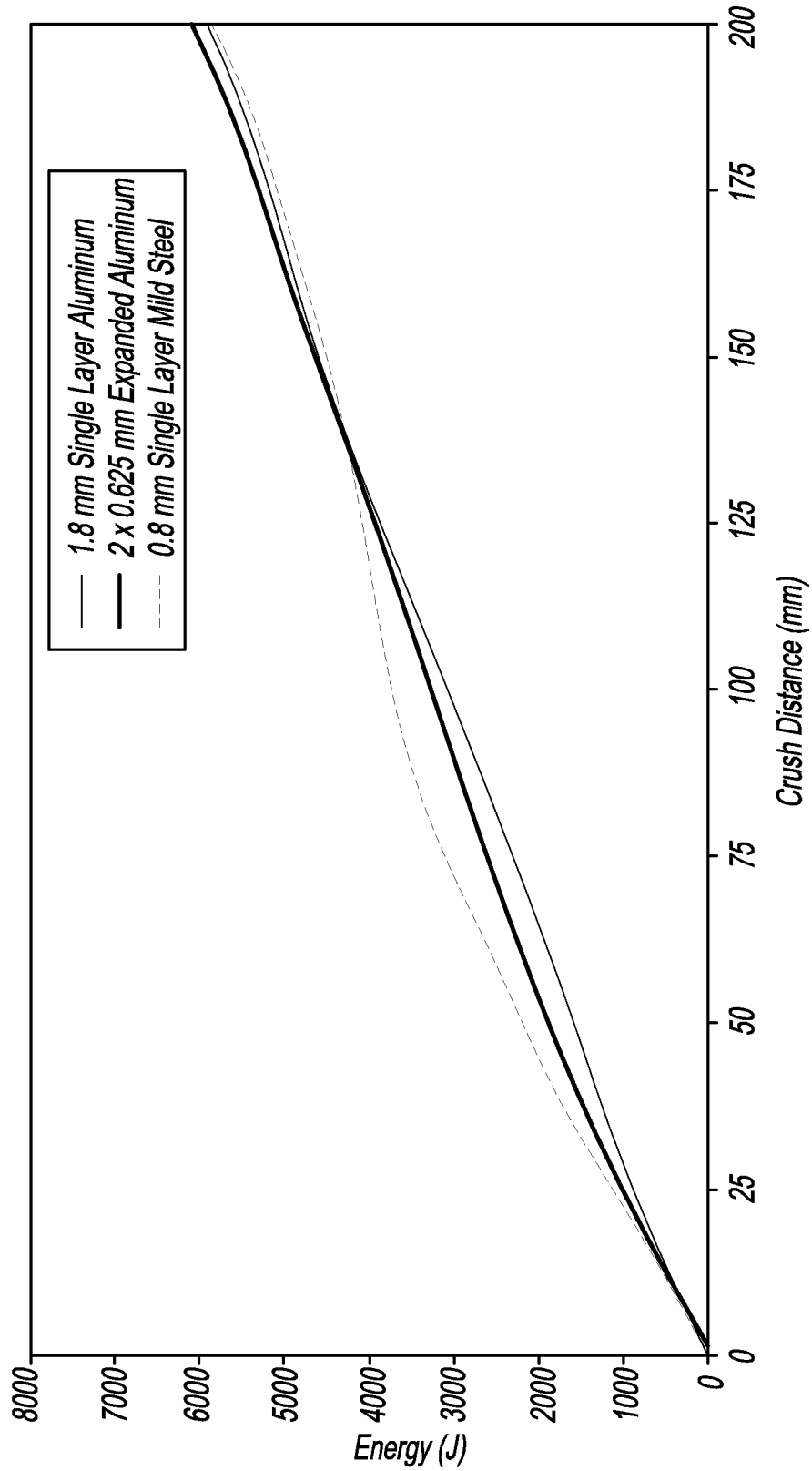
FIG. 6 shows a graphical representation of the relative crush strength of a laminate in accordance with one of the embodiments described herein.
Figure 17:
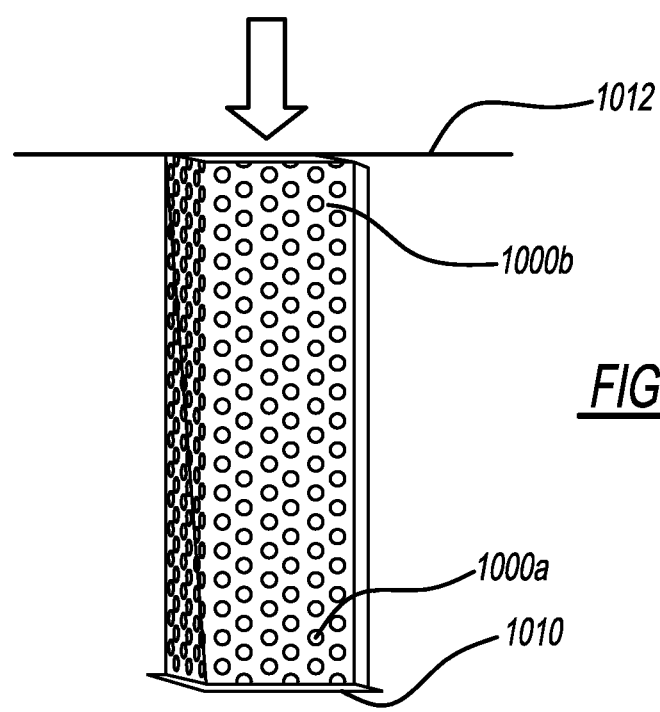
FIG. 17 is a schematic view of a test arrangement for testing the sample shown in FIG. 16.

The energy expended to crush each test can sample a given distance was measured, using the test arrangement shown in FIG. 17. The test results are shown in FIG. 6. It is seen from FIG. 6 that the energies required to crush each sample a given amount were comparable to within a range of +/−10%. However, while each sample occupied the same overall volume or envelope size, the weight of the steel sample was 2.24 lb, the weight of the single aluminum sheet was 1.7 lb, and the weight of the laminate sample was 1.12 lb. Thus, for samples of the same size, the laminate provided a weight savings of 30% over the single, thicker aluminum sheet and a weight savings of 50% over the steel sample.

Figure 18:
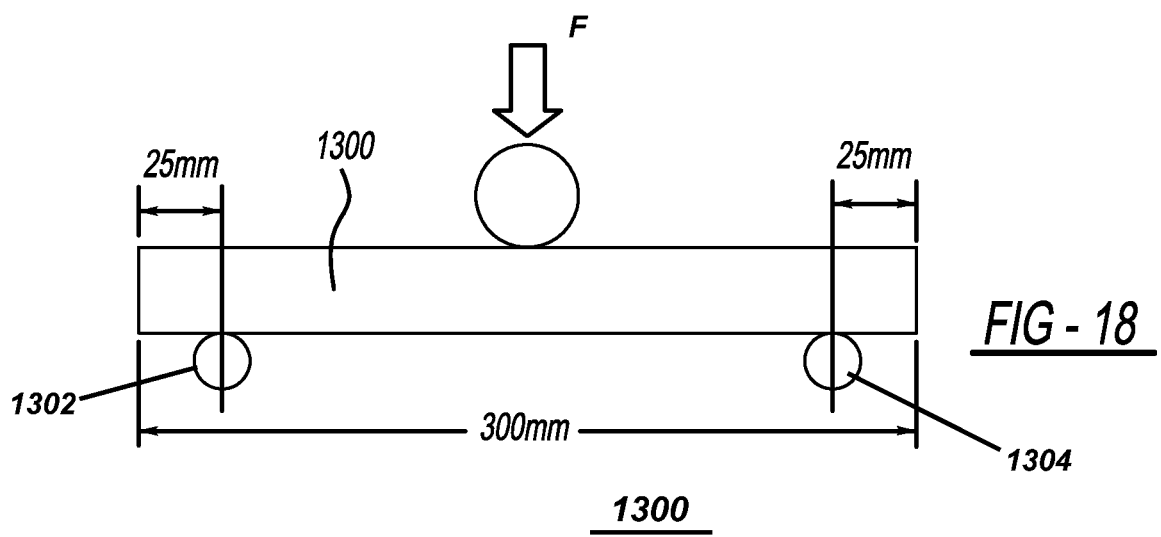
FIG. 18 is a schematic view of a test arrangement for bend testing of an exemplary sample of the finished laminate.

To evaluate the relative impact resistance of the finished laminate with respect to alternative aluminum and steel structures, a section of finished test laminate was constructed with two sheets of 0.625 mm thick aluminum alloy 5754 as the laminate constituents 902 and 904 bonded at a plurality of spaced apart circular bonding areas, using the method previously described. Test samples were also fabricated from 0.8 mm thick low carbon mild steel and 1.8 mm thick aluminum alloy 5754. Each test sample was 300 mm in length. A 3-point bend test was conducted on each sample using the test arrangement shown in FIG. 18. The test sample is generically labeled 1300 in FIG. 18. The arrangement shown in FIG. 18 is designed to induce bending of the test specimen responsive to transverse impact loading. The arrangement has spaced-apart 30 mm diameter rigid supports 1302 and 1304. A 50 mm diameter impactor applied a force F midway between the supports.

Figure 7:
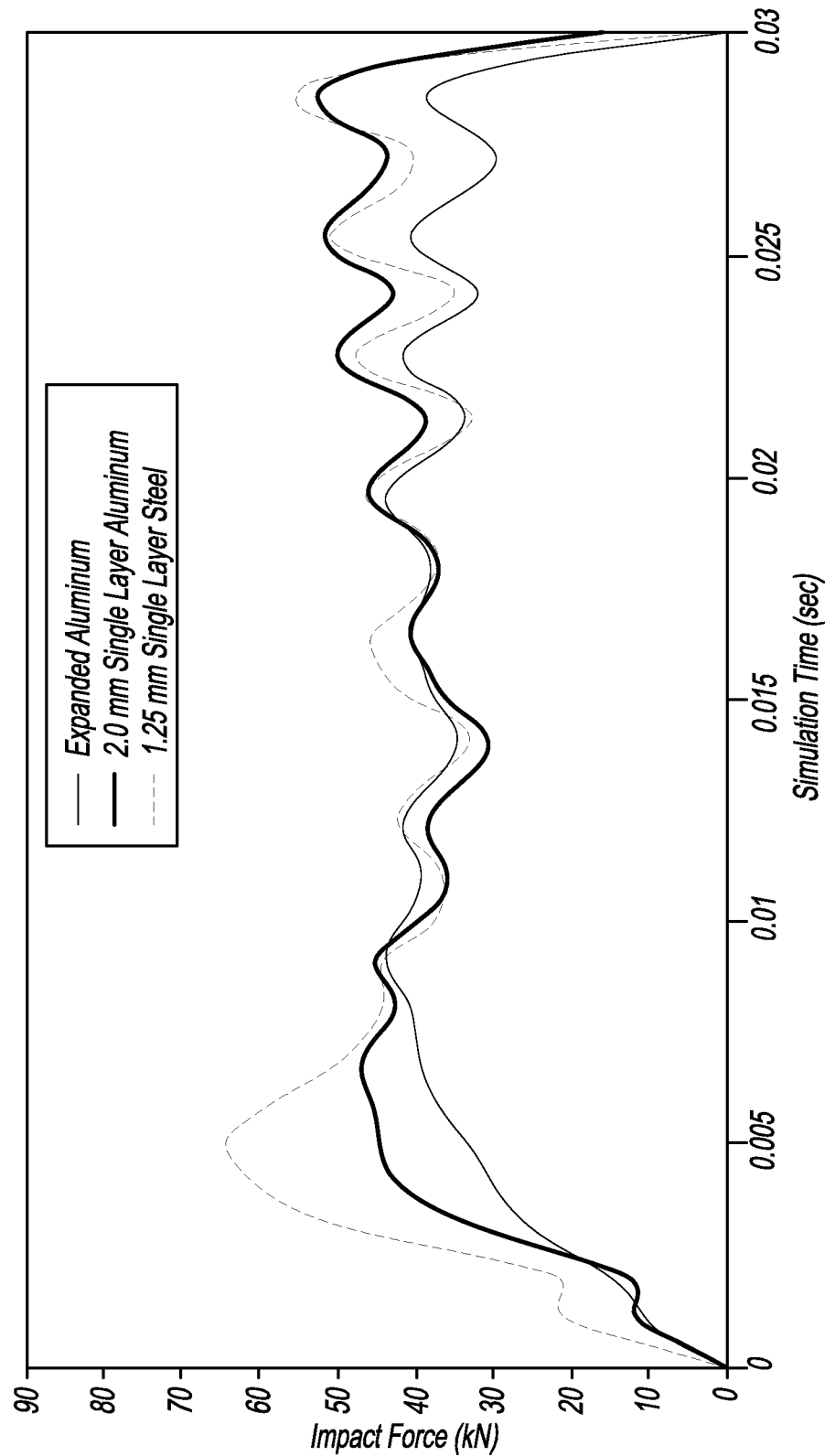
FIG. 7 shows a graphical representation of the relative impact resistance of a laminate in accordance with one of the embodiments described herein.

The test results are shown in FIG. 7. It is seen from FIG. 7 that the forces generated by impact of the impactor on the test specimens were comparable to within a range of +/−10%. However, the weight of the steel sample was 3.5 lb, the weight of the single aluminum sheet was 1.8 lb, and the weight of the laminate sample was 1.12 lb. Thus, for samples of the comparable resistance to bending forces, the laminate provided a weight savings of 30% over the single, thicker aluminum sheet and a weight savings of 68% over the steel sample.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A method comprising:
    selectively applying a material to a surface of a first metal sheet to form an uncovered portion having an array of exposed areas;
    diffusion bonding the first metal sheet to a second metal sheet at the uncovered portion to form discrete, spaced apart bonded regions that are formed as crosses along the array, wherein the diffusion bonding step includes applying pressure to the first and second metal sheets via a pair of rollers; and
    introducing pressurized gas between the first and second metal sheets to expand the first and second metal sheets in a single unbonded region that completely surrounds an outer perimeter of each bonded region within the array.

2. The method of claim 1, wherein the first and second metals sheets are aluminum alloy sheets.

3. The method of claim 1, wherein the material includes graphite or aluminum oxide.

4. The method of claim 1, wherein the bonded regions and the unbonded region have a same initial thickness and the unbonded region has a finished thickness that is greater than the initial thickness after the pressurized gas is introduced.

5. The method of claim 1, wherein the first metal sheet includes a covered portion having an edge portion such that during the diffusion bonding step an unbonded edge portion is formed.

6. The method of claim 5, wherein the pressurized gas is introduced at the unbonded edge portion.

7. A method comprising:
    selectively applying a coating to a surface of a first aluminum sheet to form a coated portion and uncoated portions having an array of exposed areas;
    diffusion bonding the first aluminum sheet to a second aluminum sheet at only the array of exposed areas to form bonded regions along the array and a single unbonded region that completely surrounds an outer perimeter of each bonded region within the array, wherein the array includes discrete, spaced apart bonded regions formed as crosses, wherein the first and second aluminum sheets are heated to a temperature of 300° C. to 525° C. prior to applying pressure during the diffusion bonding step, and wherein the diffusion bonding step includes applying pressure to the first and second aluminum sheets via a pair of rollers while the temperature of the first and second aluminum sheets is between 300° C. to 525° C.; and
    introducing pressurized gas between the first and second aluminum sheets to expand the first and second aluminum sheets in the unbonded region.

8. The method of claim 7, wherein the bonded regions and the unbonded region have a same initial thickness and the unbonded region has a finished thickness that is greater than the initial thickness after the pressurized gas is introduced.

9. The method of claim 7 further comprising:
    positioning the first and second aluminum sheets into a die including a first portion having a first cavity and a second portion having a second cavity, the first and second aluminum sheets positioned such that the first and second cavities overlie the unbonded region; and
    introducing pressurized gas between the first and second aluminum sheets to expand the first aluminum sheet into the first cavity and the second aluminum sheet into the second cavity.

10. The method of claim 7, wherein the uncoated portions include edges of the first and second aluminum sheets except for an edge passage portion of the coated portion that during the diffusion bonding step forms an unbonded edge passage portion.

11. The method of claim 10, wherein the pressurized gas is introduced at the unbonded edge passage portion.

12. The method of claim 1, wherein the bonded regions are formed along the array such that the bonded regions are arranged in a series of columns and rows.

13. The method of claim 1, wherein the ratio of an area of the single unbonded region relative to an area of the bonded regions within the array is greater than one to one.

14. The method of claim 7, wherein the bonded regions are formed along the array such that the bonded regions are arranged in a series of columns and rows.

15. The method of claim 7, wherein the ratio of an area of the single unbonded region relative to an area of the bonded regions within the array is greater than one to one.

16. The method of claim 1, further comprising heating the first and second metal sheets to a temperature of 300° C. to 525° C. prior to applying pressure during the diffusion bonding step, and wherein the diffusion bonding step includes applying pressure to the first and second metal sheets via the pair of rollers while the temperature of the first and second metal sheets is between 300° C. to 525° C.

17. A method comprising:
- selectively applying a material to a surface of a first metal sheet to form an uncovered portion having an array of exposed areas;
- diffusion bonding the first metal sheet to a second metal sheet at the uncovered portion to form discrete, spaced apart bonded regions that are formed as S-shapes along the array, wherein the diffusion bonding step includes applying pressure to the first and second metal sheets via a pair of rollers; and
- introducing pressurized gas between the first and second metal sheets to expand the first and second metal sheets in a single unbonded region that completely surrounds an outer perimeter of each bonded region within the array.

* * * * *